US012694383B2

(12) United States Patent (10) Patent No.: US 12,694,383 B2
Costello (45) Date of Patent: Jul. 28, 2026

(54) SELF-SERVICE TERMINAL (SST) MANAGEMENT ASSISTANCE

(71) Applicant: NCR Voyix Corporation, Atlanta, GA (US)

(72) Inventor: Christopher John Costello, Suwanee, GA (US)

(73) Assignee: NCR Voyix Corporation, Atlanta, GA (US)

( * ) Notice: Subject to any disclaimer, the term of this patent is extended or adjusted under 35 U.S.C. 154(b) by 514 days.

(21) Appl. No.: 17/487,362

(22) Filed: Sep. 28, 2021

(65) Prior Publication Data

US 2023/0095391 A1 Mar. 30, 2023

(51) Int. Cl.
*G06Q 20/18* (2012.01)
*G06N 20/00* (2019.01)
*G06V 20/40* (2022.01)

(52) U.S. Cl.
CPC .............. *G06Q 20/18* (2013.01); *G06N 20/00* (2019.01); *G06V 20/41* (2022.01); *G06V 20/44* (2022.01)

(58) Field of Classification Search
CPC ...... G06Q 20/18; G06Q 20/202; G06N 20/00; G06V 20/41; G06V 20/44; G07G 3/00
See application file for complete search history.

(56) References Cited

U.S. PATENT DOCUMENTS

| | | | | |
|---|---|---|---|---|
| 1,653,324 | A * | 12/1927 | Terry ........................ | F22D 5/28 |
| | | | | 91/367 |
| 2,940,637 | A * | 6/1960 | Hayward ................. | B27M 3/36 |
| | | | | 221/116 |
| 6,334,108 | B1 * | 12/2001 | Deaton .............. | G06Q 30/0255 |
| | | | | 705/14.27 |
| 6,377,935 | B1 * | 4/2002 | Deaton ................... | G07F 17/42 |
| | | | | 705/14.41 |
| 6,424,949 | B1 * | 7/2002 | Deaton .............. | G06Q 30/0238 |
| | | | | 705/14.65 |
| 6,684,195 | B1 * | 1/2004 | Deaton ................ | G06Q 20/387 |
| | | | | 705/14.38 |
| 7,631,808 | B2 * | 12/2009 | Kundu ................... | G06V 20/41 |
| | | | | 235/383 |
| 10,692,062 | B2 * | 6/2020 | Casagnap ................ | G07G 1/01 |
| 11,212,492 | B1 * | 12/2021 | Sheth ..................... | G06Q 10/10 |
| 11,328,304 | B2 * | 5/2022 | Opalka ................ | G06V 40/172 |
| 11,763,192 | B2 * | 9/2023 | Laserson ................ | G07G 3/003 |
| | | | | 705/44 |
| 2008/0218591 | A1 * | 9/2008 | Heier ..................... | G06Q 20/20 |
| | | | | 348/E7.091 |
| 2009/0057395 | A1 * | 3/2009 | He ....................... | G06F 18/2321 |
| | | | | 235/379 |

(Continued)

*Primary Examiner* — Michael Jared Walker
(74) *Attorney, Agent, or Firm* — Schwegman Lundberg & Woessner, P.A.

(57) ABSTRACT

Two or more simultaneous conditions occurring during two or more Self-Service transactions that require a response from an attendant of a management terminal are evaluated in real time. A suggested or an expected response of the attendant for each transaction is determined based on the evaluation. A priority for each expected response relative to the other expected responses is determined based on the evaluation. A queue of the expected responses in priority order is provided in real time to the management terminal for action on the expected responses in the priority order by the attendant.

6 Claims, 3 Drawing Sheets

(56)   References Cited

U.S. PATENT DOCUMENTS

| | | | | |
|---|---|---|---|---|
| 2012/0150708 A1* | 6/2012 | DeWanz | ............ | G06Q 20/4016 |
| | | | | 705/35 |
| 2015/0206081 A1* | 7/2015 | Lee | ........................ | G06Q 10/06 |
| | | | | 705/7.13 |
| 2015/0278895 A1* | 10/2015 | Joy | .......................... | G07G 1/01 |
| | | | | 705/21 |
| 2020/0286058 A1* | 9/2020 | Edwards | ................ | G06V 20/52 |
| 2021/0065189 A1* | 3/2021 | Laserson | ............. | G06Q 20/208 |
| 2021/0124741 A1* | 4/2021 | Acharya | ................ | G06Q 50/10 |
| 2021/0241249 A1* | 8/2021 | DeBardlebon | ......... | G06V 20/52 |
| 2022/0198550 A1* | 6/2022 | Meidar | .................. | G06Q 20/20 |
| 2022/0230173 A1* | 7/2022 | Sumpter | ............. | G06Q 20/202 |
| 2022/0277299 A1* | 9/2022 | Migdal | ................. | G06N 20/00 |
| 2023/0136763 A1* | 5/2023 | Yepez | ..................... | G09F 13/22 |
| | | | | 40/544 |

* cited by examiner

CLOUD/SERVER(S)
110

PROCESSOR(S)
111

NON-TRANSITORY COMPUTER-
READABLE STORAGE MEDIUM (M)
112

MACHINE-LEARNING
ALGORITHMS
113

RULES MANAGER
114

INTERVENTION MANAGER
115

RETAIL SERVER(S)
140

PROCESSORS
141

M
142

TRANSACTION
MANAGER
143

CAMERAS
140

SST(S)
130

PROCESSORS
131

M
132

TRANSACTION
MANAGER
133

MANAGEMENT TERMINALS/
MOBILE DEVICE(S)
120

PROCESSORS
121

M
122

TRANSACTION
MONITOR
123

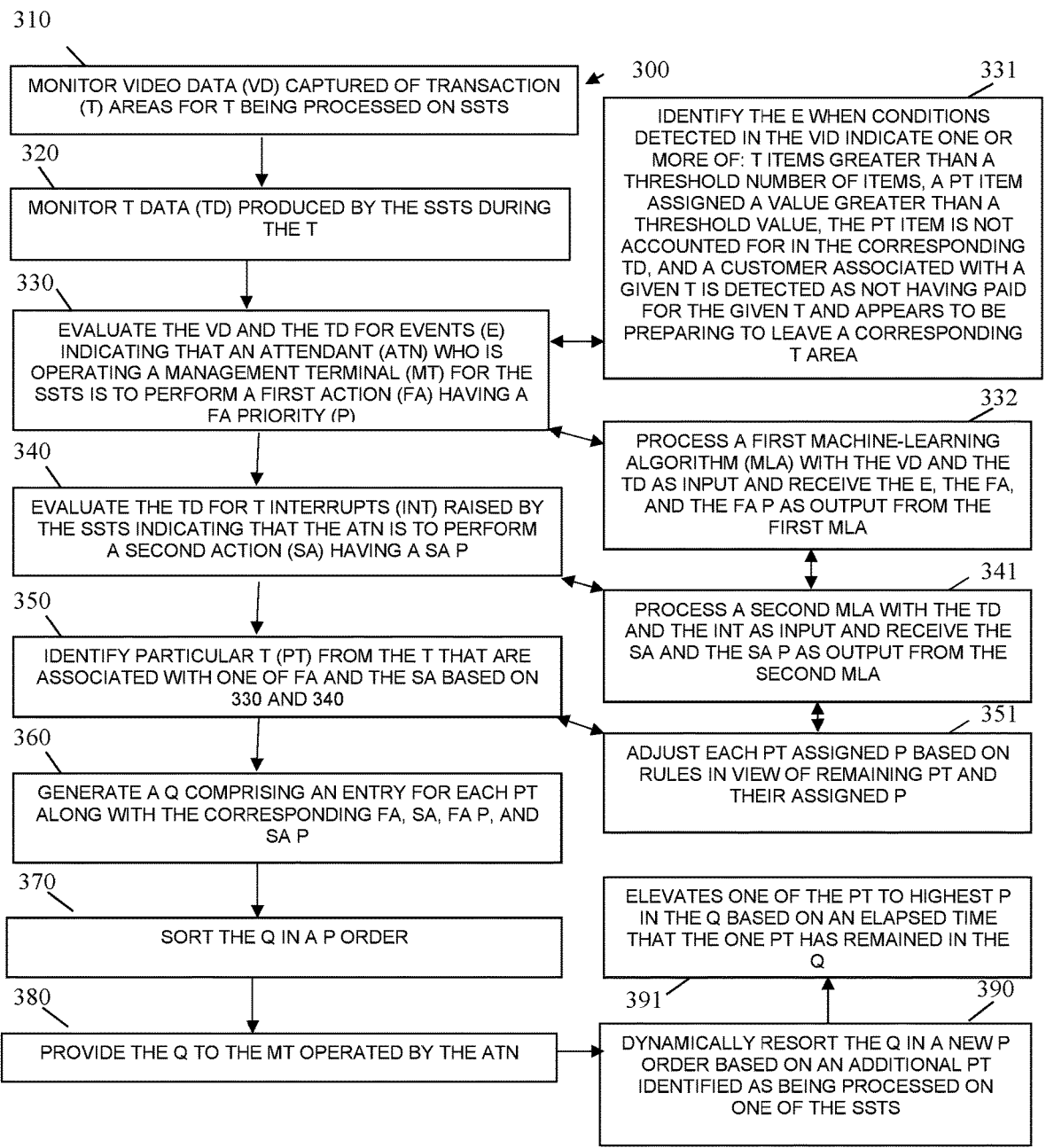

310

MONITOR VIDEO DATA (VD) CAPTURED OF TRANSACTION (T) AREAS FOR T BEING PROCESSED ON SSTS

300

331

IDENTIFY THE E WHEN CONDITIONS DETECTED IN THE VID INDICATE ONE OR MORE OF: T ITEMS GREATER THAN A THRESHOLD NUMBER OF ITEMS, A PT ITEM ASSIGNED A VALUE GREATER THAN A THRESHOLD VALUE, THE PT ITEM IS NOT ACCOUNTED FOR IN THE CORRESPONDING TD, AND A CUSTOMER ASSOCIATED WITH A GIVEN T IS DETECTED AS NOT HAVING PAID FOR THE GIVEN T AND APPEARS TO BE PREPARING TO LEAVE A CORRESPONDING T AREA

320

MONITOR T DATA (TD) PRODUCED BY THE SSTS DURING THE T

330

EVALUATE THE VD AND THE TD FOR EVENTS (E) INDICATING THAT AN ATTENDANT (ATN) WHO IS OPERATING A MANAGEMENT TERMINAL (MT) FOR THE SSTS IS TO PERFORM A FIRST ACTION (FA) HAVING A FA PRIORITY (P)

332

PROCESS A FIRST MACHINE-LEARNING ALGORITHM (MLA) WITH THE VD AND THE TD AS INPUT AND RECEIVE THE E, THE FA, AND THE FA P AS OUTPUT FROM THE FIRST MLA

340

EVALUATE THE TD FOR T INTERRUPTS (INT) RAISED BY THE SSTS INDICATING THAT THE ATN IS TO PERFORM A SECOND ACTION (SA) HAVING A SA P

341

PROCESS A SECOND MLA WITH THE TD AND THE INT AS INPUT AND RECEIVE THE SA AND THE SA P AS OUTPUT FROM THE SECOND MLA

350

IDENTIFY PARTICULAR T (PT) FROM THE T THAT ARE ASSOCIATED WITH ONE OF FA AND THE SA BASED ON 330 AND 340

351

ADJUST EACH PT ASSIGNED P BASED ON RULES IN VIEW OF REMAINING PT AND THEIR ASSIGNED P

360

GENERATE A Q COMPRISING AN ENTRY FOR EACH PT ALONG WITH THE CORRESPONDING FA, SA, FA P, AND SA P

370

SORT THE Q IN A P ORDER

ELEVATES ONE OF THE PT TO HIGHEST P IN THE Q BASED ON AN ELAPSED TIME THAT THE ONE PT HAS REMAINED IN THE Q

380

PROVIDE THE Q TO THE MT OPERATED BY THE ATN

391

390

DYNAMICALLY RESORT THE Q IN A NEW P ORDER BASED ON AN ADDITIONAL PT IDENTIFIED AS BEING PROCESSED ON ONE OF THE SSTS

FIG. 3

SELF-SERVICE TERMINAL (SST) MANAGEMENT ASSISTANCE

BACKGROUND

Self-Service (SS) transactions via Self-Service Terminals (SSTs) or Self-Checkouts (SCOs) are increasingly being deployed with greater frequency in retail stores. One reason for this deployment bonanza is because customers are becoming more accustomed to SS transactions via SCOs, but another reason is because retail stores are significantly under staffed and the pandemic exacerbated this issue for retailers.

With SS transactions, the retailer utilizes a management terminal operated by an attendant to monitor the SS transactions for purposes of customer assistance and fraud detection. Fraud remains a significant concern for the retailers during SS transactions. Furthermore, the SSTs will raise interruptions during the SS transactions, which require intervention by the attendant. A single attendant manages several SSTs at once.

Problems arise when multiple SS transactions at a given time require intervention or attention of the attendant. A primary concern of the retailer is fraud during the SS transactions but SST transactions that forced an interrupt requiring attendant intervention cannot be ignored because this can lead to customer frustration and loss of customer loyalty to the retailer while customers wait for the attendant to clear the interrupts so that their transactions can proceed, and they can checkout. Furthermore, if interruptions are not timely addressed lengthy customer queues can form at the SSTs when interrupts are not timely addressed.

Attendants do their best to service the customers and watch for fraud, but this can be a frustrating and fruitless exercise when multiple SSTs require attention of a single attendant. Moreover, there is no effective service in the industry that can prioritize and assist the attendants when multiple SS transaction require action of the attendants. Thus, the effectiveness of SST management is often dependent on the judgment and skill of the attendant, which is problematic for retailers struggling to staff their stores.

SUMMARY

In various embodiments, a system and methods for Self-Service Terminal (SST) management assistance are provided.

According to an embodiment, a method for SST management assistance is presented. Transaction data associated with simultaneous transactions being processed on Self-Service Terminals (SSTs) and being monitored by a management terminal are received. At least two of the transactions are identified as being associated with actions of an attendant who is operating the management terminal. An expected action of the attendant for each of the at least two transactions is determined based on the transaction data. A priority is assigned to each expected action based on the transaction data. A a queue is provided to the management terminal for the attendant to address in a priority order; the queue comprises each action with the corresponding priority and is sored in the priority order.

BRIEF DESCRIPTION OF THE DRAWINGS

FIG. 3 is a diagram of another method for SST management assistance, according to an example embodiment.

DETAILED DESCRIPTION

Figure 1:
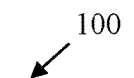
FIG. 1 is a diagram of a system for SST management assistance, according to an example embodiment.

FIG. 1 is a diagram of a system/platform 100 for SST management assistance, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing SST management assistance, presented herein and below.

System/platform 100 (herein after just "system 100") provides a processing environment by which SST transactions and SST transaction interruptions are monitored along with or, in some instances, separate from a transaction monitor of a management terminal operated by an attendant. When multiple simultaneous transactions require some action or an intervention of the attendant, the interventions required of the attendant and the actions required of the attendant are identified and prioritized and provided to the transaction monitor of the management terminal, such that the attendant does not have to rely on judgment as to handle the multiple simultaneous interventions and actions that required of the attendant.

Moreover, when an action of the attendant can be addressed through remote action via the transaction monitor, the attendant is notified via the transaction monitor, so that the attendant can stay at the management terminal and only leave the management terminal when it is necessary to address a higher priority transaction event. This is of import because many studies have consistently shown that fraud can be substantially reduced simply when a perception is created that customers are being watched and when the attendant leaves the management terminal this perception of oversight is lost for the remaining customers simultaneously performing SS transactions on the SSTs and increases the risk of loss for the retailer.

As used herein, the terms "customer" and/or "consumer," may be used interchangeably and synonymously herein and below. This refers to an individual who is engaged in SS transaction at an SST.

As used herein, the terms "attendant" and/or a "clerk" may be used interchangeably and synonymously herein and below. This refers to an individual who is operating a management terminal or a mobile management device as oversight of the SS transactions being processed at the SSTs.

System 100 comprises a cloud/server 110, one or more management terminals/mobile devices 120, a plurality of SSTs 130, one or more retail servers 140, and one or more overhead cameras 140 situated above the SSTs 130 and capturing video of the SST transaction areas during the SS transactions.

Cloud/Server 110 comprises at least one processor 111 and a non-transitory computer-readable storage medium 112. Medium 112 comprises executable instructions for a machine-learning algorithms/models (MLAs) 113, a rules manager 114, and an intervention manager 115. The executable instructions when provided to and executed by processor 111 from medium 112 cause processor 111 to perform the processing discussed herein and below for MLAs 113, rules manager 114, and intervention manager 115.

Each management terminal/mobile device 120 (hereinafter just "management terminal 120") comprises at least one processor 121 and a non-transitory computer-readable storage medium 122. Medium 122 comprises executable instructions for transaction monitor 123. The executable instructions when provided to and executed by processor 121 from medium 122 cause processor 121 to perform the processing discussed herein and below for transaction monitor 123.

Each SST 130 comprises at least one processor 131 and a non-transitory computer-readable storage medium 132. Medium 132 comprises executable instructions for a transaction manager 133. The executable instructions when provided to and executed by processor 131 from medium 132 cause processor 131 to perform the processing discussed herein and below for transaction manager 133.

Each retail server 140 comprises at least one processor 141 and a non-transitory computer-readable storage medium 142. Medium 142 comprises executable instructions for a transaction manager 143. The executable instructions when provided to and executed by processor 141 from medium 142 cause processor 141 to perform the processing discussed herein and below for transaction manager 143.

Initially, a first MLA 113 is trained on input records, each input record comprising a transaction interrupt associated with a given SS transaction, a transaction interrupt type associated with the given transaction, a transaction interrupt action/response taken by an attendant for the interrupt of the given transaction, and transaction details for the given transaction. Each input record also comprises an expected output of the first MLA 113 for each input record, the expected output is what the actual expected or optimal action/response should have been in the estimation of the retailer for the given transaction associated with the corresponding input record and a retailer-defined priority for the transaction interrupt based on the available transaction interrupts defined by the retailer. This permits the first MLA 113 to configure its factors and weights and derive a model for an algorithm, such that when provided a new input record for a current SS transaction at a given SST 130, the first MLA 113 produces as output the model action/response expected of the attendant managing the SST 130 associated with the transaction interrupt and a priority value for the interrupt.

A second MLA 113 is trained on video captured by the cameras 140 of the SST transaction area during SS transactions at the SSTs 130. Each input record during training comprises video corresponding to a given SST transaction, any transaction interrupt that was or was not associated with the given SST transaction, the transaction details for the transaction, and any action/response taken by the attendant for the transaction if one existed. The expected output comprises what an optimal action/response in the estimation of the retailer should have been for each input record if any and whether or not the transaction associated with the input record was or was not associated with actual fraud and/or the expected output comprises a video event type for a video event and/or the expected output comprises a priority to assign to the video event. This permits the second MLA 113 to configure its factors and weights to derive a model for an algorithm, such that when real-time video for a given SST transaction at a given SST 130 is provided along with the other information captured by transaction manager 133 for the transaction details in the input record, the second MLA produces a confidence value as to whether the transaction is or is not associated with fraud and any action/response expected of the attendant or produce a video event, video event type, action to perform, and a priority to assign to the video event.

Rules manager 114 is comprises of heuristic conditions based on competing priorities and the confidence values when multiple SS transaction require some action/response by an attendant. Additionally, the heuristic conditions consider a length of time during which any given SS transaction has been waiting for an attendant intervention to allow a given customer to complete the transaction. For example, if an attendant were to keep experience multiple SS transactions requiring actions/responses by the attendant, a customer with a low priority transaction interrupt may be left waiting for an unreasonable amount of time, in these situations the rules manager 114 using the heuristic conditions can dynamically bump the priority of the customer's transaction to the top of the attendants action/response queue. In fact, the retailer can set a maximum wait time for any given transaction, which is handled as one of the heuristic conditions.

Intervention manager 115 trains the MLAs 113 in cooperation with data provided or gathered from the retail server 140. Intervention manager 115 also receives real time data associated with SST transaction and/video from transaction manager 143 and cameras 140. Further, intervention manager assembles output received from the MLAs 113 and rules manager 114 to provide expected action/response and priorities for each SST requiring attendant action/response in a priority ordered list via an Application Programming Interface (API) to transaction monitor 123 being operated by an attendant when the management terminal 120 experiences two or more simultaneous SST transactions requiring an action/response of the attendant. Intervention manager 115 is continuously and in real-time adjusting an action/response queue of the attendant that is displayed on monitor 123 to the attendant, such that at any given point in time the top priority action/response of the attendant is presented at the top of the queue to the attendant on management terminal 120. This ensures that the attendant is not simply picking transactions to perform an action/response randomly or based on a judgment of the attendant and addresses concerns of the retailer of fraud and customer frustration. This allows the retailer to have a consistent level of service to the customers, address fraud concerns, and ensure that the attendant is not getting burnt out and can handle oversight of the SSTs 130 to a level of performance expected by the retailer.

Each action/response may also be associated with an identifier/indicator in the queue that informs the attendant whether the action/response can be performed remotely at the management terminal 120 via the transaction monitor 123 or requires the attendant to visit the corresponding SST 130 to address the issue.

In an embodiment, the second MLA 113 is trained to identify from the video events and video event types detected in the video data, such as a transaction small basket transaction (below a threshold number of items) and a large basket transaction (above a second threshold of items). Large basket transactions are more likely to be associated with fraud by customers not scanning each of the items. The second MLA 113 may further be trained to identify high value items in the small and large basket transaction, since high value items are more likely to not be scanned by any customer that commits fraud. Here, the expected action/response of the attendant may be just to simply pay attention and watch the transactions closely.

In an embodiment, the second MLA 113 is trained to identify from the video of a transaction when a basket of items was scanned at the SST 130, but payment was not received, and the customer is identified from the video as preparing to leave or starting to leave the transaction area associated with the transaction. Here, the expected action/response of the attendant may be to politely go to the SST 130 and ask if the customer needs any assistance to deter the customer from committing the fraud that appears to be in progress.

In an operational example of system 100 consider the following scenario. In a busy bullpen (bank of SSTs 130 being managed by an attendant at management terminal 120), a couple enters with a large basket of items, another customer enters with alcohol (requiring attendant government identification card validation for the customer's birthdate), and a third customer is currently checkout out at one of the SSTs 130.

The third customer has the transaction manager 133 generate a known high-false positive rate intervention for an item weight that does not match a security scale alert while the second customer buying the alcohol has the transaction manager 133 of that customer's SST 130 generate an identification intervention and the attendant knows that they need to check on the full basket customer (couple). Based on inputs provided to MLAs 113 and Rules manager 114, intervention manager 115 identifies the priorities and expected actions/responses for the three circumstances and provides a queue with the item weight mismatch first, the identification verification second, and the large basket third. For the first item of the queue the expected action is identified as a remote override of the mismatch from transaction monitor 123 so that the transaction manager 133 ignores the interrupt and proceeds with the transaction associated with the third customer. For the second item of the queue, the expected action of the attendant is listed as go to the SST 130 associated with the second customer and verify the birthdate on a provided government-issued identification card of the customer. For the third item of the queue, the expected action of the attendant is to go to the SST 1330 associated with the couple and politely ask if they need any assistance in handling the large basket of items for their transaction.

If more transactions require the attendant to address with the above-presented scenario after the attendant clears remotely the item mismatch intervention of the second customer, intervention manager 115 dynamically reorganizes the queue based on the newly detected priorities and the priorities associated with the couple and the third customer accounting for the length of time that the couple and the second customer have been waiting for a response/action by the attendant as was discussed above with the reorganized queue utilizing the wait times performed by rules manager 114 on behalf of intervention manager 115.

In an embodiment, the service queue, suggested actions/responses of the attendant, and actual actions/responses of the attendants can further be provided by intervention manager in real-time to additional devices associated with the retailer, such as mobile devices of managers, desktop computers of supervising staff, etc. This may be provided within a dashboard for monitoring by supervisors both performance of the attendants and the current state and load of the management terminals 120.

In an embodiment, as was discussed above, the management terminal 120 may be a mobile device operated by the attendant, such as a tablet computer, a phone, or a wearable processing device.

In an embodiment, there may be multiple second MLAs 113 trained to identify specific concerns for fraud, such as high-value items, basket size, non-scan of an item being tracked in a basket of items for a transaction, non-payment, etc. Each of the second MLAs 113 and the first MLA 113 may be processed in parallel on cloud/server 110 such that the input data required by each MLA 113 is available simultaneously from a common buffer or storage area. Intervention and fed as output is received into rules manager 114.

In an embodiment, the MLAs 113, rules manager 114, and intervention manager 115 are subsumed into and processed on a specific retail server 140 with transaction manager 143.

In an embodiment, transaction manager 143 is hosted and processed on behalf of the retailer associated with the SSTs 130 and management terminal 120 within a processing environment of cloud/server 110.

In an embodiment, inventions manager 115 is processed on management terminal 120.

In an embodiment, video captured by cameras 140 are streamed in real-time to a memory buffer and/or a storage directly accessible by cloud/server 110.

Figure 2:
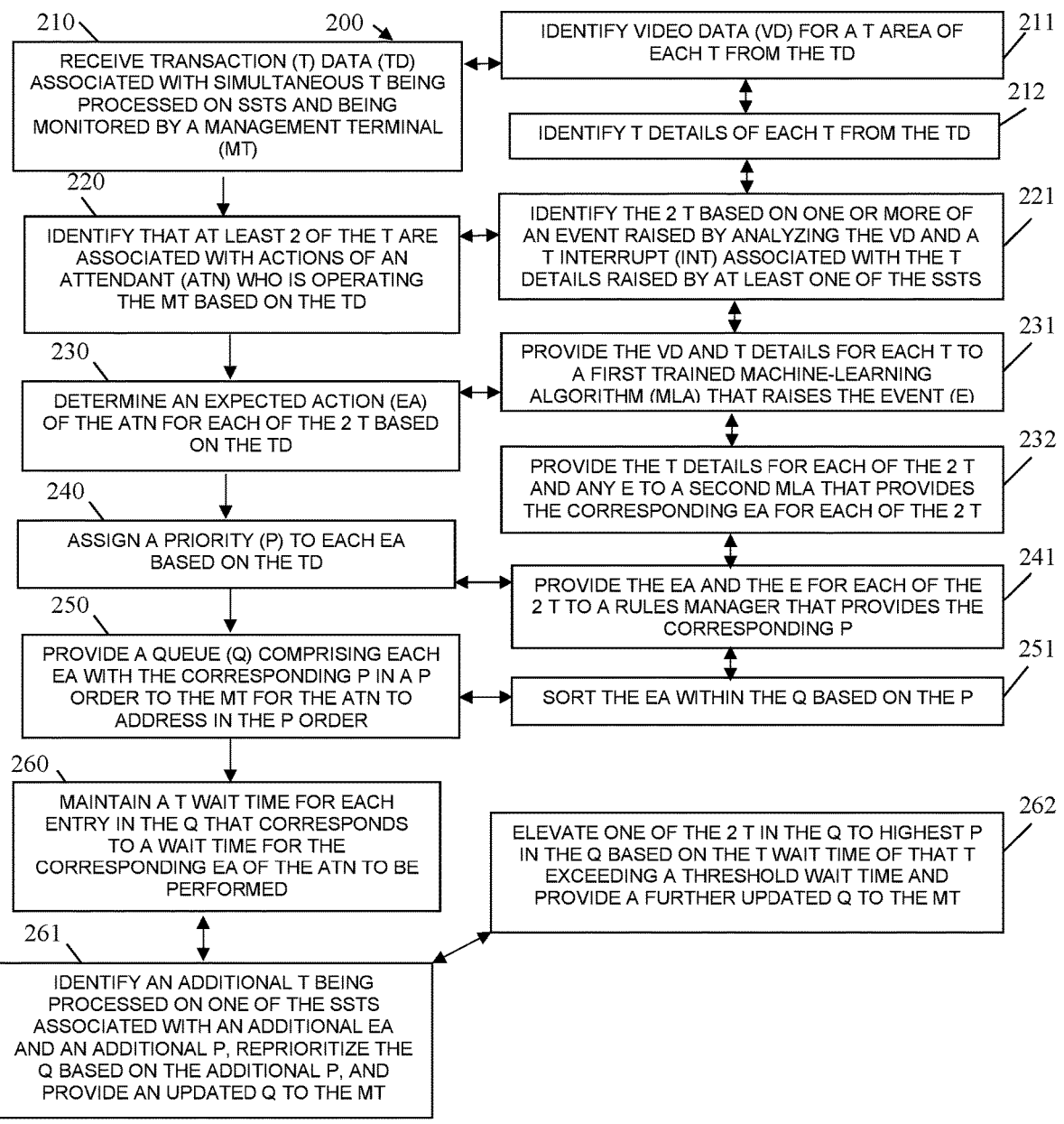
FIG. 2 is a diagram of a method for SST management assistance, according to an example embodiment.

The above-referenced embodiments and other embodiments are now discussed within FIGS. 2-3.

FIG. 2 is a diagram of a method 200 for SST management assistance, according to an example embodiment. The software module(s) that implements the method 200 is referred to as a "management terminal interventions prioritization manager." The management terminal interventions prioritization manager is implemented as executable instructions programmed and residing within memory and/or a non-transitory computer-readable (processor-readable) storage medium and executed by one or more processors of one or more devices. The processor(s) of the device that executes the management terminal interventions prioritization manager are specifically configured and programmed to process the management terminal interventions prioritization manager. The management terminal interventions prioritization manager may have access to one or more network connections during its processing. The network connections can be wired, wireless, or a combination of wired and wireless.

In an embodiment, the device that executes the management terminal interventions prioritization manager is cloud 110. Cloud 110 comprises a plurality of servers logically cooperating and accessible as a single server 110 (cloud 110).

In an embodiment, the device that executes the management terminal interventions prioritization manager is a server 110 that is separate from any given retail server 120.

In an embodiment, the device that executes the management terminal interventions prioritization manager is retail server 140.

In an embodiment, the management terminal interventions prioritization manager is all or some combination of 113, 114, and/or 115.

At 210, the management terminal interventions prioritization manager receives transaction data associated with simultaneously transactions being processed on SSTs 130 and being monitored by a management terminal 120.

In an embodiment, at 211, the management terminal interventions prioritization manager identifies video data for a transaction area of each transaction from the transaction data.

In an embodiment of 211 and at 212, the management terminal interventions prioritization manager identifies transaction details of each transaction from the transaction data.

At 220, the management terminal interventions prioritization manager identifies that at least 2 of the transaction are associated with actions of an attendant who is operating the management terminal based on the transaction data.

In an embodiment of 212 and 220, at 221, the management terminal interventions prioritization manager identifies the two or more transactions based on one or more of an event raised by analyzing the video data and a transaction interrupt associated with the transaction details raised by at least one of the SSTs 130.

At 230, the management terminal interventions prioritization manager determines an expected action of the attendant for each of the 2 or more transactions.

In an embodiment of 221 and 230, at 231, the management terminal interventions prioritization manager provides the video data and the transaction details for each transaction to a first trained MLA 113 that raises the event.

In an embodiment of 231 and at 232, the management terminal interventions prioritization manager provides the transaction details for each of the two or more transactions to a second MLA 113 that provides the corresponding expected action for each of the two or more transactions.

At 240, the management terminal interventions prioritization manager assigns a priority to each of the expected actions based on the transaction data.

In an embodiment of 232 and 240, at 241, the management terminal interventions prioritization manager provides the expected actions and the events for each of the two or more transaction to a rules manager 114 that provides the corresponding priority.

At 250, the management terminal interventions prioritization manager provides a queue comprising each expected action with the corresponding priority in a priority order to the management terminal 120 for the attendant to address in the priority order.

In an embodiment of 241 and 250, at 251, the management terminal interventions prioritization manager sorts the expected actions within the queue based on the priorities.

In an embodiment, at 260, the management terminal interventions prioritization manager maintains a transaction wait time for each entry of the queue that corresponds to a wait time for the corresponding expected action of the attendant to be performed.

In an embodiment of 260 and at 261, the management terminal interventions prioritization manager identifies an additional transaction being processed on one of the SSTs 130 associated with an additional expected action and an additional priority. The management terminal interventions prioritization manager reprioritizes the queue based on the additional priority and the management terminal interventions prioritization manager provides an updated queue to the management terminal 120.

In an embodiment of 261 and at 262, the management terminal interventions prioritization manager elevates one of the two or more transactions in the queue to highest priority in the queue based on the transaction wait time of that transaction exceeding a threshold wait time and provides a further updated queue to the management terminal 120.

FIG. 3 is a diagram of another method 300 for SST management assistance, according to an example embodiment. The software module(s) that implements the method 300 is referred to as an "SST invention manager." The SST invention manager is implemented as executable instructions programmed and residing within memory and/or a non-transitory computer-readable (processor-readable) storage medium and executed by one or more processors of a device. The processors that execute the SST invention manager are specifically configured and programmed for processing the SST invention manager. The SST invention manager may have access to one or more network connections during its processing. The network connections can be wired, wireless, or a combination of wired and wireless.

In an embodiment, the device that executes the SST invention manager is cloud 110. In an embodiment, the device that executes the SST invention manager is server 110.

In an embodiment, the device that executes the SST invention manager is retail server 140.

In an embodiment, the SST invention manager is all of or some combination of 113, 114, 115, and/or method 200 of FIG. 2.

The SST invention manager presents another and, in some ways, enhanced processing perspective from that which was discussed above for cloud 110 and method 200.

At 310, the SST invention manager monitors video data captured of transaction areas being processed on SSTs 130.

At 320, the SST invention manager monitors transaction data produced by the SSTs 130 during the transactions.

At 330, the SST invention manager evaluates the video data and the transaction data for events indicating that an attendant who is operating a management terminal 120 for the SSTs 130 is to perform a first action having a first priority.

In an embodiment, at 331, the SST invention manager identifies the event when conditions detected in the video data indicate one or more of: transaction items greater than a threshold number of items (large basket transaction), a particular transaction item assigned a value greater than a threshold value (high value item), the particular transaction item is not accounted for in the corresponding transaction data, and a customer associated with a given transaction is detected as not having paid for the given transaction and appears to leave a corresponding transaction area.

In an embodiment, at 332, the SST invention manager processes a first MLA 113 with the video data and the transaction data as input and receives the events, the first action and the first-action priority as output from the first MLA 113.

At 340, the SST invention manager evaluates the transaction data for transaction interrupts raised by the SSTs 130 indicating that the attendant is to perform a second action having a second-action priority.

In an embodiment of 332 and 340, at 341, the SST invention manager processes a second MLA 113 with the transaction data and the transaction interrupt as input and receives the second action and the second-action priority as output from the second MLA 113.

At 350, the SST invention manager identifies particular transactions from the transactions that are associated with one of the first actions and the second actions based on 330 and 340.

In an embodiment of 341 and 350, at 351, the SST invention manager adjusts each particular transaction's assigned priority based on rules in view of remaining particular transactions and their assigned priorities.

At 360, the SST invention manager generates a queue comprising an entry for each particular transaction along with the corresponding first action, second action, first-action priority, and second-action priority.

At 370, the SST invention manager sorts the queue in priority order.

At 380, the SST invention manager provides the queue to the management terminal 120 operated by the attendant.

In an embodiment, at 390, the SST invention manager dynamically resorts the queue in a new priority order based on an additional particular transaction identified as being processed by one of the SSTs 130.

In an embodiment of 390 and at 391, the SST invention manager elevates one of the particular transactions to highest priority order in the queue based on an elapsed time that the one particular transaction has remained in the queue and unaddressed by the attendant.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

monitoring video data captured of transaction areas for transactions being processed on self-service terminals (SSTs) using overhead cameras situated above the SSTs;

monitoring transaction data produced by the SSTs during the transactions;

evaluating, using a first machine-learning algorithm, the video data and the transaction data for events indicating that an attendant, who is operating a management terminal for the SSTs, is to perform a first action having a first-action priority, the first machine-learning algorithm trained on training video data and training transaction data to detect specific fraud events and to output corresponding first actions and corresponding first-action priorities, wherein the first machine-learning algorithm configures factors and weights to derive a model that produces a confidence value indicative of whether a given transaction is associated with fraud;

evaluating, using a second machine-learning model, the transaction data for transaction interrupts raised by the SSTs indicating that the attendant is to perform a second action having a second-action priority, wherein the second machine-learning algorithm is trained on available transaction data and available transaction interrupts to output corresponding second actions and corresponding second-action priorities;

identifying particular transactions from the transactions that are associated with one or more of the first action or the second action based on the evaluating of the video data and the transaction data;

generating a queue comprising an entry for each particular transaction along with a corresponding first action or second action, and a corresponding first-action priority, or second-action priority, wherein each entry in the queue is associated with a respective identifier indicative of whether the first action or second action can be performed remotely at the management terminal via a transaction monitor or whether an attendant visit to a corresponding SST is required;

sorting the queue in a priority order based on rules that dynamically adjust priorities considering wait times of transactions;

continuously and in real-time adjusting the queue;

dynamically evaluating a priority of a particular transaction of a customer to highest priority in the queue when a particular wait time of the customer exceeds a maximum wait time set by a retailer;

and providing the queue to the management terminal operated by the attendant.

2. The method of claim 1, further comprising:

dynamically resorting the queue in a new priority order based on an additional particular transaction identified as being processed on one of the SSTs.

3. The method of claim 1, wherein evaluating the video data further comprises identifying the events based on when conditions detected in the video data indicate one or more of: transaction items associated with greater than a threshold number of items, a particular transaction item associated with an assigned value greater than a threshold value, the particular transaction item not being accounted for in corresponding transaction data, a customer associated with a particular transaction being detected as not having paid for the particular transaction and appearing to be preparing to leave a corresponding transaction area.

4. The method of claim 1, wherein evaluating the video data further comprises processing the first machine-learning algorithm with the video data and the transaction data as input and receiving the events, the first action, and the first-action priority as output from the first machine-learning algorithm.

5. The method of claim 4, wherein evaluating the transaction data and the transaction interrupts further comprises providing as input to the second machine-learning algorithm the transaction data and the transaction interrupts and receiving the second action and the second-action priority as output from the second machine-learning algorithm.

6. The method of claim 5, wherein identifying further comprises adjusting an assigned priority of each particular transaction based on the rules in view of remaining particular transactions and corresponding assigned priorities.

* * * * *